United States Patent
Yue et al.

(10) Patent No.: US 10,096,822 B2
(45) Date of Patent: Oct. 9, 2018

(54) LITHIUM ION BATTERY GRAPHITE NEGATIVE ELECTRODE MATERIAL AND PREPARATION METHOD THEREOF

(71) Applicant: SHENZHEN BTR NEW ENERGY MATERIALS INC, Shenzhen (CN)

(72) Inventors: Min Yue, Shenzhen (CN); Yan Liang, Shenzhen (CN); Huiqing Yan, Shenzhen (CN); Minghua Deng, Shenzhen (CN); Youyuan Huang, Shenzhen (CN)

(73) Assignee: SHENZHEN BRT NEW ENERGY MATERIALS INC., Shenzhen (CN)

( * ) Notice: Subject to any disclaimer, the term of this patent is extended or adjusted under 35 U.S.C. 154(b) by 757 days.

(21) Appl. No.: 14/243,186

(22) Filed: Apr. 2, 2014

(65) Prior Publication Data
US 2014/0302394 A1 Oct. 9, 2014

(30) Foreign Application Priority Data

Apr. 3, 2013 (CN) .......................... 2013 1 0115596

(51) Int. Cl.
*H01M 4/36* (2006.01)
*H01M 4/587* (2010.01)
(Continued)

(52) U.S. Cl.
CPC ............. *H01M 4/366* (2013.01); *C01B 32/05* (2017.08); *C01B 32/162* (2017.08);
(Continued)

(58) Field of Classification Search
CPC ...... H01M 4/366; H01M 4/587; H01M 4/583; H01M 4/428; H01M 4/0471;
(Continued)

(56) References Cited

FOREIGN PATENT DOCUMENTS

| CN | 1224251 | 7/1999 |
| CN | 102299308 | 12/2011 |

(Continued)

OTHER PUBLICATIONS

WO2013/029211 Certified English Translation (Sep. 2016).*
WO2013/029212 Certified English Translation (Sep. 2016).*
Japanese Notice of Rejection.
(Continued)

*Primary Examiner* — Ula C Ruddock
*Assistant Examiner* — Matthew W Van Oudenaren
(74) *Attorney, Agent, or Firm* — Workman Nydegger (57) ABSTRACT

A lithium ion battery graphite negative electrode material and preparation method thereof. The lithium ion battery graphite negative electrode material is a composite material including graphite substrates, surface coating layers coated on the graphite substrates and carbon nanotubes and/or carbon nanofibers grown in situ on the surface of the surface coating layers. The preparation method thereof includes, in solid phase or liquid phase circumstance, the coated carbon material precursor forms the surface coating layer of amorphous carbon by carbonization, and then carbon nanotubes and/or carbon nanofibers having high conductive performance are formed on the surface of the surface coating layers by vapor deposition. This coating mode of the combination of solid phase with gas phase or of liquid phase and gas phase makes the amorphous carbon formed on the surface of the graphite substrates more uniform and dense. The lithium ion battery graphite negative electrode material has properties of high charging-discharging efficiency at first time and excellent cycle stability at either high or low temperatures. The charging-discharging efficiency at first time is up to more than 95%, and the capacity retention after 528 cycles is more than 92%.

19 Claims, 3 Drawing Sheets

(51) Int. Cl.
    *C01B 32/05*     (2017.01)
    *C01B 32/162*    (2017.01)
    *H01M 4/133*     (2010.01)
    *H01M 4/583*     (2010.01)
    *H01M 4/1393*    (2010.01)
    *H01M 4/96*      (2006.01)
    *H01M 10/052*    (2010.01)

(52) U.S. Cl.
    CPC ......... *H01M 4/587* (2013.01); *C01B 2202/34* (2013.01); *C01B 2202/36* (2013.01); *H01M 4/133* (2013.01); *H01M 4/1393* (2013.01); *H01M 4/583* (2013.01); *H01M 4/96* (2013.01); *H01M 10/052* (2013.01)

(58) Field of Classification Search
    CPC .. H01M 10/052; H01M 4/133; H01M 4/1393; H01M 4/96; C01B 31/02; C01B 31/0233; C01B 2202/36; C01B 2202/34; C01B 32/162; C01B 32/05
    See application file for complete search history.

(56) References Cited

FOREIGN PATENT DOCUMENTS

| | | |
|---|---|---|
| CN | 102394287 | 3/2012 |
| CN | 102623684 | 8/2012 |
| CN | 102299308 | 12/2012 |
| CN | 102820471 | 12/2012 |
| JP | 2001196064 | 7/2001 |
| JP | 2014524636 | 9/2014 |
| KR | 20080006899 | 1/2008 |
| KR | 20090112542 | 10/2009 |
| KR | 20100041567 | 4/2010 |
| KR | 20110113193 | 10/2011 |
| WO | WO2009133807 | 11/2009 |
| WO | WO2013029212 | 12/2011 |
| WO | 2013029211 | * 3/2013 |
| WO | 2013029212 | * 3/2013 |

OTHER PUBLICATIONS

Chinese Office Action dated Feb. 16, 2015 in Chinese Application No. 201310115596.5.

* cited by examiner

LITHIUM ION BATTERY GRAPHITE NEGATIVE ELECTRODE MATERIAL AND PREPARATION METHOD THEREOF

TECHNICAL FIELD

The present invention relates to the field of lithium ion battery negative electrode materials, particularly to a lithium ion battery graphite negative electrode material and a preparation method thereof.

BACKGROUND ART

Commercial lithium ion battery carbon negative electrode materials primarily include natural graphite and artificial graphite. The compatibility between natural graphite and electrolytes is poor, and co-intercalation of solvated lithium ions is likely to occur as charging, which makes the graphite layer peel off. Further, the electrolyte continues to react with the graphite layers, leading to a great disadvantage in cycle stability of the battery. At present, techniques to modify the materials mainly include surface-coating to construct a core-shell structure by multiphase coating technology, doping and surface oxidation, etc., thereby improving electrochemical properties. However there still exist many problems such as bad contact between one electrode material particle and another, and between one and a current collector, large surface resistance, poor peel strength, cycle swelling during charge-discharge process, etc. These problems above seriously affect the cycle life and stability of a lithium ion battery.

Chinese patent CN102299308A has reported a lithium ion battery negative electrode material and a method of preparing the same. The material is a composite material consisting of carbon nanotubes and/or carbon nanofibers directly grown in situ on the surface of graphite substrates, and carbon nanotubes and/or carbon nanofibers mixed between the graphite substrates by chemical vapor deposition method. Using the material as a lithium ion battery graphite negative electrode material enhances the discharge capacity, rate performance, liquid absorption and cycle performance. However, the specific surface area of the material obtained by this method is larger and the surface-coating layer formed merely by the vapor deposition method is looser, which leads to a poor stability of the SEI membrane formed during charge-discharge process, more consummation of electrolyte, and thus there still exists in deficiency in cycle stability of batteries at high temperature.

DISCLOSURE

Regarding the deficiency of the prior art, one object of the present invention lies in providing a lithium ion battery graphite negative electrode material, which possesses the features of high rate performance and excellent cycle stability at high and low-temperature.

The lithium ion battery graphite negative electrode material is a composite material comprising graphite substrates, surface-coating layers coated on the graphite substrates and carbon nanotubes and/or carbon nanofibers grown in situ on the surface of the surface-coating layers.

Preferably, the interlayer spacing $D_{002}$ of the composite material is 0.3356~0.347 nm; the specific surface area is 1~20 m$^2$/g; the surface-coating layer is amorphous carbon formed by carbonization of a carbon material precursor; and the mass ratio of the surface-coating layers to the graphite substrates is 0.01:100~15:100. The carbon nanotubes and/or carbon nanofibers are of network structure with an average length of 0.5~100 μm and an average diameter of 10~500 nm. The mass ratio of the carbon nanotubes and/or carbon nanofibers to the graphite substrates is 0.01:100~15:100.

Compared to the prior art, the lithium ion battery graphite negative electrode material provided by the present invention comprises graphite substrates, surface-coating layers coating on the graphite substrates and the carbon nanotubes and/or carbon nanofibers grown in situ on the surface of the surface-coating layers. The surface-coating layer is amorphous carbon formed by carbonization of carbon material precursor coated on the surface of the graphite substrates in a solid-phase or liquid-phase mode. The carbon nanotubes and/or carbon nanofibers are conductive carbon nanotubes and/or carbon nanofibers formed on the surface of the surface-coating layers by vapor deposition method under the action of a catalyst. This coating mode by the combination of solid phase and gas phase or of liquid phase and gas phase makes the amorphous carbon formed on the surface of the graphite substrates more uniform and dense, which not only enhances the compatibility between the graphite substrates and electrolytes, but also solves the problem of material swelling and poor adhesion of pole pieces during lithium deintercalation process, thereby achieving the objects of reducing internal resistance, improving conductivity, rate performance and cycle stability at high or low-temperature of the material.

One object of the present invention further lies in providing a preparation method of the lithium ion battery graphite negative electrode material. The lithium ion battery graphite negative electrode material obtained by the method has the features of possessing high rate performance and excellent cycle stability at high and low-temperature.

The preparation method of the lithium ion battery graphite negative electrode material comprises the following steps:
(1) The graphite substrate material is mixed with the carbon material precursor containing a catalyst to obtain a mixture;
(2) Then, the mixture is subjected to chemical vapor deposition under a protective atmosphere at an elevated temperature of 200~1800, followed by heat insulation and temperature reduction, to obtain the lithium ion battery graphite negative electrode material;

Preferably, the following step is conducted after step (2):
(3) are conducted and the lithium ion battery graphite negative electrode material with a particle size of 1~50 μm is obtained through Screening, demagnetization.

Preferably, the mixing in the step (1) is solid-phase mixing or liquid-phase mixing.

Preferably, the solid-phase mixing is conducted by one selected from the group consisting of high speed modified VC mixer, cone mixer, ball mill, kneading machine and fusion machine, more preferably high speed modified VC mixer.

Preferably, the rotational speed of the high speed modified VC mixer is 100~8000 rpm, for example 110 rpm, 190 rpm, 210 rpm, 490 rpm, 510 rpm, 1000 rpm, 2000 rpm, 3000 rpm, 4000 rpm, 4900 rpm, 5100 rpm, 5900 rpm, 6100 rpm, 7000 rpm, 7500 rpm, 7990 rpm, etc., more preferably 200~6000 rpm, even more preferably 500~5000 rpm.

Preferably, the mixing time of the high speed modified VC mixer is 1~300 min, for example 1.9 min, 2.1 min, 4 min, 6 min, 10 min, 20 min, 50 min, 100 min, 179 min, 181 min, 200 min, 235 min, 245 min, 270 min and 295 min, etc., more preferably 2~240 min, even more preferably 5~180 min.

Preferably, the liquid-phase mixing is conducted by a high speed stirrer or by sol-gel method, more preferably by a high speed stirrer, even more preferably by a high speed stirrer in a solvent, followed by drying to obtain the mix.

Preferably, the stirring speed of the high speed stirrer is 100~12000 rpm, for example 110 rpm, 190 rpm, 210 rpm, 350 rpm, 490 rpm, 510 rpm, 1000 rpm, 2000 rpm, 4000 rpm, 6000 rpm, 7500 rpm, 7900 rpm, 8100 rpm, 9000 rpm, 9900 rpm, 10100 rpm, 11000 rpm and 11900 rpm, etc., more preferably 200~10000 rpm, even more preferably 500~8000 rpm.

Preferably, the stirring time of the high speed stirrer is 1~300 min, for example 1.9 min, 2.1 min, 4 min, 6 min, 10 min, 20 min, 50 min, 100 min, 150 min, 179 min, 181 min, 200 min, 235 min, 245 min, 270 min and 295 min, etc., more preferably 2~240 min, even more preferably 5~180 min.

Preferably, the mixing temperature of the liquid-phase mixing is 5~95° C., for example 6° C., 7° C., 9° C., 11° C., 15° C., 20° C., 40° C., 55° C., 70° C., 89° C., 91° C., 93° C. and 94° C., etc., more preferably 8~92° C., even more preferably 10~90° C.

Preferably, the solvent of the liquid-phase mixing is water and/or organic solvents.

Preferably, the organic solvent of the liquid-phase mixing is one selected from the group consisting of tetrahydrofuran, amides, alcohols and ketones, or combination of at least two, more preferably one selected from the group consisting of tetrahydrofuran, dimethylacetamide, C1-C6 alcohols and C3-C8 ketones, or combination of at least two, wherein the C1-C6 alcohols may be one selected from the group consisting of methanol, ethanol, ethylene glycol, propanol, isopropanol, 1,2-propanediol, 1,3-propanediol, glycerol, n-butanol, 1,2-butanediol, 1,3-butanediol, 1,4-butanediol, n-pentanol, and 2-hexanol, or combination of at least two, the C3-C8 ketones may be one selected from the group consisting of acetone, methyl ethyl ketone, methyl propyl ketone, N-methylpyrrolidone, ethyl propyl ketone, methyl butyl ketone, ethyl n-butyl ketone, methyl pentyl ketone or methyl hexyl ketone, or combination of at least two, even more preferably one selected from the group consisting of tetrahydrofuran, dimethylacetamide, ethanol, glycerol, isopropanol, acetone and N-methylpyrrolidone, or combination of at least two. The typical but non-limiting examples of the combinations include: a combination of tetrahydrofuran and ethanol, a combination of tetrahydrofuran and glycerol, a combination of ethanol and glycerol, a combination of ethanol, glycerol and isopropanol, a combination of glycerol and acetone, etc.

Preferably, the mass ratio of the solvent to the graphite substrate used in the liquid-phase mixing is 0.5:10~50:10, for example 0.6:10, 0.9:10, 1.1:10, 2:10, 5:10, 9:10, 15:10, 19:10, 25:10, 29:10, 31:10, 39:10, 41:10, 45:10, 49:10, etc., more preferably 1:10~40:10, even more preferably 1:10~30:10.

Preferably, the drying is conducted by a spray dryer, a suction filtration machine or a freeze dryer, more preferably a spray dryer.

Preferably, the inlet temperature of the spray dryer is 110~500° C., for example 120° C., 140° C., 160° C., 200° C., 300° C., 345° C., 360° C., 390° C., 410° C., 490° C., etc., more preferably 130~400° C., even more preferably 150~350° C. The outlet temperature of the spray dryer is 20~250° C., for example 30° C., 34° C., 36° C., 40° C., 49° C., 51° C., 100° C., 145° C., 155° C., 170° C., 190° C., 210° C., 245° C., etc., more preferably 35~200° C., even more preferably 50~150° C. The pressure of the spray dryer is 5~150 MPa, for example 6 MPa, 8 MPa, 9 MPa, 11 MPa, 20 MPa, 50 MPa, 95 MPa, 105 MPa, 115 MPa, 125 MPa, 145 MPa, etc., more preferably 7~120 MPa, even more preferably 10~100 MPa. The feeding frequency for the spray dryer is 2~200 Hz, for example 3 Hz, 4 Hz, 6 Hz, 9 Hz, 11 Hz, 30 Hz, 50 Hz, 80 Hz, 90 Hz, 98 Hz, 102 Hz, 130 Hz, 155 Hz, 165 Hz, 180 Hz, 195 Hz, etc., more preferably 5~160 Hz, even more preferably 10~100 Hz.

Preferably, the graphite substrate material in the step (1) is one selected from the group consisting of natural flake graphite, microcrystalline graphite, crystalline vein graphite, artificial graphite, natural spherical graphite, mesocarbonmicrobead and conductive graphite, or combination of at least two. The typical but non-limiting examples of the combinations include: a combination of natural flake graphite and microcrystalline graphite, a combination of microcrystalline graphite and crystalline vein graphite, a combination of artificial graphite and mesocarbonmicrobead, a combination of mesocarbonmicrobead and conductive graphite, etc.

Preferably, the carbon content of the graphite substrate material in the step (1) is more than 85%, the ratio of long size to short size is 1.0~4.5 and the average particle size is 3~40 μm.

Preferably, the carbon material precursor in the step (1) is a chemical substance in which a catalyst is included inherently or introduced by a solid-phase or liquid-phase method.

Preferably, the chemical substance is one selected from the group consisting of furan resins, phenolic resins, epoxy resins, polyfurfural, polyallyl alcohol, polyvinyl alcohol, polyvinyl chloride, polyethylene glycol, polyethylene oxide, polyvinylidene fluoride, acrylic resins, polyacetylene, polypyrrole, polypropylbenzene (polyacenes), polythiophene, polyaniline, polyphenylenes, polyphenylenevinylene, polydialkynes, coal tar pitch, petroleum asphalt, etc., or combinations of at least two. The typical but non-limiting examples of the combinations include: a combination of a furan resin and a phenolic resin, a combination of polyfurfural and poly allyl alcohol, a combination of polyvinyl alcohol, polyvinyl chloride and polyethylene glycol, a combination of polyethylene oxide and polyvinylidene fluoride, a combination of polyphenylenevinylene and a polydialkyne, a combination of coal tar pitch and petroleum asphalt, etc.

Preferably, the mass ratio of the carbon material precursor in the step (1) to the graphite substrate material is 0.01:100~40:100, for example 0.05:100, 0.09:100, 0.11:100, 0.45:100, 0.55:100, 1:100, 2:100, 5:100, 9:100, 15:100, 20:100, 29:100, 31:100, 34:100, 36:100, 39:100, etc., more preferably 0.1:100~35:100, even more preferably 0.5:100~30:100.

Preferably, the catalyst is one selected from the group consisting of metallic simple substances, metal oxides, alloys, salts, organometallic compounds and layered double metal hydroxides, or combinations of at least two. More preferably, the metallic simple substance is a simple substance of iron, cobalt, nickel; the metal oxide is $Ni_{0.5}Mg_{0.5}O$, MgO, FeO, $Fe_2O_3$, NiO, CoO, $Co_2O_3$ or $Co_3O_4$; the alloy is an alloy of Er—Ni, Ni—Al, Ni—Cu—Al or Ni—La—Al; the salt is a nitrate, a sulfate, a metal halide, even more preferably $Fe(NO_3)_3$, $Ni(NO_3)_2$, $Co(NO_3)_2$, $NiSO_4$ or $FeCl_3$; the organometallic compound is a ferrocene; the layered double metal hydroxide is Co—Al—$CO_3$ LDHs or Mg—Al—$CO_3^{2-}$ LDHs.

Preferably, the content of the catalyst is less than 10%, for example 9%, 7%, 6%, 4%, 2%, 1.1%, 0.9%, 0.5%, 0.1%, 0.05%, 0.01%, etc., more preferably less than 8%, even more preferably less than 5%.

Preferably, there is the following step between the step (1) and (2):

(2a) the mix obtained in the step (1) is subjected to low-temperature carbonization or high temperature graphitization under a protective atmosphere, obtaining a low-temperature carbonized material or a high temperature graphitized material.

Preferably, the specific process of the low-temperature carbonization described in the step (2a) is as follows: the mix obtained in the step (1) is placed into the crucible equipped in takasago kiln, tunnel kiln, roller kiln or a baking furnace, heated to 200~2000° C. in a heating rate of less than 20° C./min under a protective atmosphere, subjected to a low-temperature carbonization for less than 60 h, and then subjected to temperature reduction.

Preferably, the heating rate during the low-temperature carbonization in the step (2a) is less than 20° C./min, for example 0.1° C./min, 0.2° C./min, 0.4° C./min, 0.6° C./min, 0.9° C./min, 1.1° C./min, 2° C./min, 5° C./min, 9° C./min, 11° C./min, 14° C./min, 16° C./min, 17° C./min, 18° C./min and 19° C./min, etc., more preferably 0.5~15° C./min, even more preferably 1~10° C./min.

Preferably, the temperature during the low-temperature carbonization in the step (2a) is 200~2000° C., for example 230° C., 250° C., 290° C., 310° C., 500° C., 1000° C., 1700° C., 1790° C., 1810° C. and 1990° C., etc., more preferably 240~1900° C., even more preferably 300~1800° C.

Preferably, the protective atmosphere in the step (2a) is inert gas, more preferably, the inert gas is one selected from the group consisting of nitrogen gas, argon gas, helium gas and neon gas, or combination of at least two.

Preferably, the flow rate of the protective atmosphere in the step (2a) is less than 20 m$^3$/h, more preferably 0.05~15 m$^3$/h, even more preferably 0.1~10 m$^3$/h.

Preferably, the time for low-temperature carbonization in the step (2a) is less than 60 h, for example 59 h, 55 h, 50 h, 49 h, 47 h, 40 h, 30 h, 20 h, 15 h, 12 h, 8 h, 5 h, 2 h, 0.5 h, 0.1 h, etc., more preferably 0~48 h.

Preferably, the specific process of the high temperature graphitization in the step (2a) is as follows: the mix obtained in the step (1) is placed into the crucible equipped in graphitization furnace, heated to 2500~3500° C. in a heating rate less than 20° C./min under a protective atmosphere, subjected to high temperature graphitization for less than 60 h, and then subjected to temperature reduction.

Preferably, the heating rate during the high temperature graphitization in the step (2a) is less than 20° C./min, for example 0.1° C./min, 0.2° C./min, 0.4° C./min, 0.6° C./min, 0.9° C./min, 1.1° C./min, 2° C./min, 5° C./min, 9° C./min, 11° C./min, 14° C./min, 16° C./min, 17° C./min, 18° C./min, 19° C./min, etc., more preferably 0.5~15° C./min, even more preferably 1~10° C./min.

Preferably, the temperature during the high temperature graphitization in the step (2a) is 2500~3500° C., for example 2600° C., 2680° C., 2720° C., 2800° C., 2900° C., 3000° C., 3190° C., 3210° C., 3490° C., etc., more preferably 2700~3200° C.

Preferably, the time for the high temperature graphitization in the step (2a) is less than 80 h, for example 79 h, 65 h, 59 h, 55 h, 50 h, 49 h, 47 h, 40 h, 30 h, 20 h, 15 h, 12 h, 8 h, 5 h, 2 h, 0.5 h, 0.1 h, etc., more preferably 0~48 h.

The process of the step (2) is conducted in a rotary furnace, a tube furnace or a carbon tube furnace, more preferably, in a rotary furnace.

Preferably, the specific process of the step (2) is as follows: in the furnace chamber of a rotary furnace, a tube furnace or a carbon tube furnace, under a protective atmosphere, the temperature is elevated to 200~1800° C. and maintained for less than 6 h; then a carbon source gas is constantly aerated and the temperature is maintained for less than 12 h; then the carbon source gas is stopped and the protective gas is aerated again; the lithium ion battery negative electrode material is obtained after temperature reduction.

Preferably, in the specific process of the step (2), the protective atmosphere is inert gas, more preferably, the inert gas is one selected from the group consisting of nitrogen gas, argon gas, helium gas and neon gas, or combination of at least two.

Preferably, in the specific process of the step (2), the flow rate of the protective atmosphere is less than 20 L/min, for example 19 L/min, 18 L/min, 16 L/min, 14 L/min, 11 L/min, 9 L/min, 8 L/min, 5 L/min, 2 L/min, 1 L/min, 0.2 L/min, 0.1 L/min, etc., more preferably less than 15 L/min, even more preferably 0.05~10 L/min.

Preferably, in the specific process of the step (2), the rotational speed of the furnace chamber is less than 100 rpm, for example 2 rpm, 5 rpm, 10 rpm, 19 rpm, 21 pm, 40 rpm, 49 rpm, 51 rpm, 70 rpm, 90 rpm, 99 rpm, etc., more preferably less than 50 rpm, even more preferably less than 20 rpm.

Preferably, in the specific process of the step (2), the heating rate is less than 80° C./min, for example 0.2° C./min, 0.5° C./min, 1° C./min, 2° C./min, 5° C./min, 10° C./min, 20° C./min, 40° C./min, 49° C./min, 51° C./min, 59° C./min, 61° C./min, 70° C./min, 79° C./min, etc., more preferably less than 60° C./min, even more preferably 0.1~50° C./min.

Preferably, in the specific process of the step (2), the temperature is elevated up to 200~1800° C., for example 240° C., 290° C., 310° C., 500° C., 700° C., 1000° C., 1200° C., 1290° C., 1310° C., 1490° C., 1510° C., 1600° C., 1790° C., etc., more preferably 200~1500° C., even more preferably 300~1300° C.

Preferably, in the specific process of the step (2), the temperature is maintained for less than 6 h, for example 0.4 h, 0.6 h, 1 h, 1.5 h, 2 h, 2.9 h, 3.1 h, 4 h, 4.4 h, 4.6 h, 5 h, 5.9 h, etc., more preferably less than 4.5 h, even more preferably 0.5 h~3 h.

Preferably, in the specific process of the step (2), the aerated carbon source gas is one selected from the group consisting of methane, acetylene, ethylene, natural gas, liquefied petroleum gas, benzene, thiophene, or combination of at least two. The typical and non-limiting examples include: a combination of methane and acetylene, a combination of acetylene and ethylene, a combination of methane, acetylene and ethylene, a combination of natural gas and liquefied petroleum gas, etc.

Preferably, in the specific process of the step (2), the flow rate of the aerated carbon source gas is less than 20 L/min, for example 19 L/min, 18 L/min, 16 L/min, 14 L/min, 11 L/min, 9 L/min, 8 L/min, 5 L/min, 2 L/min, 1 L/min, 0.2 L/min, 0.1 L/min, etc., more preferably less than 15 L/min, even more preferably 0.05~10 L/min.

Preferably, in the specific process of the step (2), the carbon source gas is constantly aerated and the temperature is maintained for less than 12 h, for example 11.9 h, 11 h, 10 h, 9 h, 8.1 h, 7.9 h, 7 h, 6.1 h, 5.9 h, 5 h, 2 h, 1 h 0.5 h, etc., more preferably less than 8 h, even more preferably less than 6 h.

Preferably, in the specific process of the step (2), temperature reduction is conducted by aerating compressed air between the heat conductive layers on the furnace wall and inside the furnace wall or naturally.

Preferably, in the specific process of the step (2), the temperature reduction is conducted to below 100° C., more preferably is subjected naturally to room temperature.

Preferably, the particle size of the lithium ion battery graphite negative electrode material obtained in the step (3) is 1~50 μm, for example 1.2 μm, 2.8 μm, 3.2 μm, 5.2 μm, 10.5 μm, 20.6 μm, 25.9 μm, 32.8 μm, 40.5 μm and 49.5 μm, more preferably 3~50 μm.

Preferably, the preparation method of the lithium ion battery graphite negative electrode material comprises the following steps:

(1) The carbon material precursor, in which a catalyst with a mass fraction of less than 5% is included inherently or introduced by solid-phase or liquid-phase method, is subjected to solid-phase mixing or liquid-phase mixing with the graphite substrate material in a mass ratio of 0.5:100~30:100, obtaining the mix; wherein the catalyst is one selected from the group consisting of metallic simple substances, metal oxides, alloys, salts, organometallic compounds and layered double metal hydroxides, or combination of at least two;

(2) The mix obtained in the step (1) is subjected to low-temperature carbonization or high temperature graphitization under a protective atmosphere, obtaining a low-temperature carbonized material or a high temperature graphitized material respectively;

(3) Under the protective atmosphere, the low-temperature carbonized material or the high temperature graphitized material obtained in the step (2) is heated to 300~1300° C. and the temperature is maintained for less than 6 h; then a carbon source gas is aerated at 300~1300° C. and the temperature is maintained for less than 12 h; the protective gas is aerated again; the lithium ion battery negative electrode material is obtained after temperature reduction.

(4) the lithium ion battery graphite negative electrode material with a particle size of 1~50 μm is obtained through screening and demagnetization.

In the method of the present invention, the graphite substrate material is mixed with the carbon material precursor containing a catalyst to obtain the mix. The carbon material precursor forms the surface-coating layer of the amorphous carbon in solid phase or liquid phase. The surface-coating layer has the advantages of poor crystallinity and good compatibility with electrolytes, thereby improving the reversible lithium intercalation capacity and the cycle stability of the negative electrode material. The catalyst forms uniformly catalytic active sites on the surface of the surface-coating layer, and then the carbon nanotubes and/or carbon nanofibers having conductivity are formed on the surface of the surface-coating layer by vapor deposition method. The carbon nanotubes and/or carbon nanofibers have the advantages of good conductivity and high mechanical strength, which contributes to improve the rate performance and the processability of the negative electrode material. Meanwhile the presence of the carbon nanotubes and/or carbon nanofibers can increase the lithium storage capacity. In a word, this coating mode by the combination of solid-phase and gas phase or of liquid-phase and gas phase makes the amorphous carbon formed on the surface of the graphite substrates more uniform and dense, which not only enhances the compatibility between the graphite substrates and electrolytes, but also solves the problem of materials swelling and poor adhesion of pole pieces during lithium deintercalation process.

In the present invention, unless otherwise specified, "/" means "and".

Compared to the prior art, the present invention has the feature of high first charge-discharge efficiency and excellent cycle stability at high and low temperature. The first charge-discharge efficiency thereof reaches up to more than 95%, which is 3~5% higher than the prior art. The capacity retention after 528 cycles is more than 92%. The rate performance 10 C/1 C increases by 4~5%. The preparation method of the present invention is simple and easy to operate, reduces manufacturing cost, and tends to achieve a large scale manufacture.

DESCRIPTION OF EXEMPLARY EMBODIMENTS

For the assistance of understanding the present invention, the following embodiments of the present invention are presented as follows. Those skilled in the art will understand that the embodiments are presented merely to explain the present invention and shall not be regarded as specific limits to the present invention.

Example 1

Natural spherical graphite having a carbon content of more than 85% and a particle size of 3~40 μm was placed in a VC-500 type mixer. Coal tar pitch was introduced in the mass ratio of 0.5:100 to the natural spherical graphite, to conduct solid-phase mixing with rotational speed of 5000 rpm and mixing time of 5 min, obtaining a mix. The mix was placed in a crucible equipped in a tunnel kiln. The volume of the mix was 50% of the capacity of the crucible. Nitrogen gas was aerated in a flow rate of 10 m$^3$/h, the temperature was elevated up to 300° C. in a heating rate of 0.1° C./min, and the heat treatment was conducted for 1 h. The heat-treatment product was placed in a rotatory furnace with a rotational speed of 1 rpm. Nitrogen gas was aerated in a flow rate of 0.05 L/min, the temperature was elevated up to 300° C. in a heating rate of 0.1° C./min, and maintained for 0.5 h. Then the carbon source gas, that is, natural gas was aerated in a flow rate of 0.05 L/min to perform vapor deposition for 5 h. Then the aeration of the carbon source gas was stopped; nitrogen gas was aerated constantly in a flow rate of 0.05 L/min for 6 h. Then cold air was aerated between the heat conductive layers on the furnace wall and inside the furnace wall to reduce the temperature to below 100° C. and the aeration of nitrogen gas was stopped; the resulting products were subjected to screening and demagnetization. The demagnetization was conducted for 3 times, the magnetic flux density was 10000 Gs, the treating temperature was 10° C., and the striking times by the electromagnetic hammer was 20 times/sec, thereby obtaining the lithium ion battery graphite negative electrode material with an average particle size of 12.9 μm.

Example 2

Natural flake graphite having a carbon content of more than 85% and a particle size of 3~40 μm was placed in a VC-500 type mixer. Petroleum asphalt was introduced in the mass ratio of 30:100 to the natural flake graphite, to conduct solid-phase mixing with a rotational speed of 500 rpm and mixing time of 180 min, obtaining a mix. The mix was placed in a crucible equipped in a tunnel kiln. The volume of the mix was 10% of the capacity of the crucible. Nitrogen gas was aerated in a flow rate of 10 m³/h, the temperature was elevated up to 1300° C. in a heating rate of 20° C./min, and the heat treatment was conducted for 30 h. The heat-treatment product was placed in a rotatory furnace with a rotational speed of 20 rpm. Nitrogen gas was aerated in a flow rate of 10 L/min, the temperature was elevated up to 1300° C. in heating rate of 50° C./min, and maintained for 1 h. Then the carbon source gas methane was aerated in a flow rate of 10 L/min to perform vapor deposition for 0.1 h. Then the aeration of the carbon source gas was stopped; nitrogen gas was aerated constantly in a flow rate of 10 L/min for 6 h. Then cold air was aerated between the heat conductive layers on the furnace wall and inside the furnace wall to reduce the temperature to below 100° C. and the aeration nitrogen gas was stopped. The resulting products were subjected to screening and demagnetization. The demagnetization was conducted for 3 times, the magnetic flux density was 10000 Gs, the treating temperature was 10° C., and the striking frequency by the electromagnetic hammer was 20 times/sec, thereby obtaining the lithium ion battery graphite negative electrode material with an average particle size of 11.9 μm.

Example 3

Artificial graphite having a carbon content of more than 85% and a particle size of 3~40 μm was placed in a VC-150 type mixer. Coal tar pitch was introduced in the mass ratio of 10:100 to the natural flake graphite, to conduct solid-phase mixing with a rotational speed of 3000 rpm and mixing time of 150 min, obtaining a mix. The mix was placed in a crucible equipped in a tunnel kiln. The volume of the mixed material was 50% of the capacity of the crucible. Nitrogen gas was aerated in a flow rate of 5 m³/h, the temperature was elevated up to 600° C. in a heating rate of 10° C./min, and the heat treatment was conducted for 10 h. The heat-treatment product was placed in a rotatory furnace with a rotational speed of 10 rpm; nitrogen gas was aerated in a flow rate of 5 L/min. The temperature was elevated up to 900° C. in a heating rate of 25° C./min, and maintained for 3 h. Then the carbon source gas, that is, acetylene was aerated in a flow rate of 5 L/min to perform vapor deposition for 3 h. Then the aeration of the carbon source gas was stopped; nitrogen gas was aerated constantly in a flow rate of 5 L/min for 3 h. Then cold air was aerated between the heat conductive layers on the furnace wall and inside the furnace wall to reduce the temperature to below 100° C. and the aeration of the nitrogen gas was stopped. The resulting products were subjected to screening and demagnetization. The demagnetization was conducted for 3 times, the magnetic flux density was 10000 Gs, the treating temperature was 10° C., and the striking frequency by the Electromagnetic hammer was 20 times/sec, thereby obtaining the lithium ion battery graphite negative electrode material with an average particle size of 16.9 μm.

Example 4

Acrylic resin doped with 1% $Fe(NO_3)_3$ was added to water to conduct liquid mixing using a high speed stirrer with a stirring rotational speed of 8000 rpm and stirring time of 5 min at a temperature of 90° C. To the mixture was added mesocarbonmicrobeads having a carbon content of more than 85% and a particle size of 3~40 μm, wherein the mass ratio of the acrylic resin to mesocarbonmicrobeads was 0.1:100, to conduct liquid mixing using high speed stirrer with a stirring rotational speed of 8000 rpm and stirring time of 5 min. The mass ratio of the used solvent, that is, water to mesocarbonmicrobeads was 2:1. A spray dryer was used for drying, with an inlet temperature of 350° C., an outlet temperature of 150° C., a pressure of 100 MPa and a feeding frequency of 10 Hz. The drying product was placed into a rotary furnace with a rotational speed of 5 rpm. Argon gas was aerated in a flow rate of 15 L/min; the temperature was elevated up to 800° C. in a heating rate of 3.5° C./min and maintained for 2 h. Then the carbon source gas, that is, acetylene was aerated in a flow rate of 5 L/min to perform vapor deposition for 3 h. Then the aeration of the carbon source gas was stopped and argon gas was aerated constantly in a flow rate of 5 L/min for 3 h. Then cold air was aerated between the heat conductive layers on the furnace wall and inside the furnace wall to reduce the temperature to below 100° C. and the aeration of the argon gas was stopped. The resulting products were subjected to screening and demagnetization. The demagnetization was conducted for 5 times, the magnetic flux density was 10000 Gs, the treating temperature was 10° C., and the striking frequency by the electromagnetic hammer were 20 times/sec, thereby obtaining the lithium ion battery graphite negative electrode material with an average particle size of 18.2 μm.

Example 5

Acrylic resin doped with 5% $Fe(NO_3)_3$ was added to N-pyrrolidone (NMP) to conduct liquid-phase mixing using a high speed stirrer with a stirring rotational speed of 500 rpm and a stirring time of 180 min at a temperature of 10° C. To the mixture was added natural spherical graphite having a carbon content of more than 85% and a particle size of 3~40 μm was added to the mixture above, wherein the mass ratio of the acrylic resin to the natural spherical graphite was 0.01:100 to conduct liquid mixing using high speed stirrer with a stirring rotational speed of 500 rpm and stirring time of 180 min. The mass ratio of the used solvent, that is, N-pyrrolidone (NMP) to the natural spherical graphite was 3:1. A spray dryer was used for drying, with an inlet temperature of 150° C., an outlet temperature of 50° C., a pressure of 10 MPa and a feeding frequency of 100 Hz. The drying product was placed into a rotary furnace with a rotational speed of 0.5 rpm. Neon gas was aerated in a flow rate of 20 L/min; the temperature was elevated up to 600° C. in a heating rate of 0.2° C./min and maintained for 1 h. Then the carbon source gas, that is, acetylene was aerated in a flow rate of 0.5 L/min to perform vapor deposition for 1 h. Then the aeration of the carbon source gas was stopped and neon gas was aerated constantly in a flow rate of 0.5 L/min for 2 h. Then cold air was aerated between the heat conductive layers on the furnace wall and inside the furnace wall to reduce the temperature to below 100° C. and the aeration of the neon gas was stopped. The resulting products were subjected to screening and demagnetization. The demagnetization was conducted for 5 times, the magnetic flux density was 10000 Gs, the treating temperature was 10° C., and the striking frequency by the electromagnetic hammer was 20 times/sec, thereby obtaining the lithium ion battery graphite negative electrode material with an average particle size of 12.8 μm.

Example 6

To the mixture was introduced 4% $Fe(NO_3)_3$ solid was doped into petroleum asphalt and placed in a VC-500 type mixer to conduct solid-phase mixing with a rotational speed of 5000 rpm and a mixing time of 5 min, obtaining a mixture. Natural spherical graphite having a carbon content of more than 85% and a particle size of 3~40 μm was placed in a VC-500 type mixer and the mixture above was introduced in the mass ratio of 7:100 to the natural spherical graphite to conduct solid-phase mixing with a rotational speed of 5000 rpm and a mixing time of 5 min, obtaining a mix. The mix was placed in a rotary furnace with a rotational speed of 15 rpm. Nitrogen gas was aerated in a flow rate of 9 L/min; the temperature was elevated up to 1000° C. in a heating rate of 15° C./min and maintained for 2 h. Then the carbon source gas, that is, acetylene was aerated in a flow rate of 9 L/min to perform vapor deposition for 0.5 h. Then the aeration of the carbon source gas was stopped and nitrogen gas was aerated constantly in a flow rate of 9 L/min for 5 h. Then cold air was aerated between the heat conductive layers on the furnace wall and inside the furnace wall to reduce the temperature to below 100° C. and the aeration of the nitrogen gas was stopped. The resulting products were subjected to screening and demagnetization. The demagnetization was conducted for 5 times, the magnetic flux density was 10000 Gs, the treating temperature was 10° C., and the striking frequency by the electromagnetic hammer was 20 times/sec, thereby obtaining the lithium ion battery graphite negative electrode material with an average particle size of 11.4 μm.

Example 7

Polyethylene oxide doped with 0.01% Ni was added to dimethylacetamide to conduct liquid-phase mixing using a high speed stirrer with a stirring rotational speed of 5000 rpm and a stirring time of 20 min at a temperature of 30° C. To the mixture was added a crystalline vein graphite having a carbon content of more than 85% and a particle size of 3~40 μm, wherein the mass ratio of polyethylene oxide to the crystalline vein graphite was 40:100, to conduct liquid mixing using high speed stirrer with a stirring rotational speed of 5000 rpm and a stirring time of 120 min. The mass ratio of the used solvent, that is, dimethylacetamide to the crystalline vein graphite was 1:10. A spray dryer was used for drying, with an inlet temperature of 280° C., an outlet temperature of 120° C., a pressure of 50 MPa and a feeding frequency of 50 Hz. The drying product was placed into a crucible equipped in a graphitization furnace. Helium gas was aerated in a flow rate of 10 L/min; the temperature was elevated up to 2700° C. in a heating rate of 10° C./min and high temperature graphitization was conducted for 48 h before temperature reduction. The high-temperature graphitized product was placed into a rotary furnace with a rotational speed of 50 rpm. Helium gas was aerated in a flow rate of 0.05 L/min; the temperature was elevated up to 1500° C. in a heating rate of 60° C./min and maintained for 4.5 h. Then the carbon source gas, that is, liquefied petroleum gas was aerated in a flow rate of 0.05 L/min to perform vapor deposition for 0.5 h. Then the aeration of the carbon source gas was stopped and helium gas was aerated constantly in a flow rate of 10 L/min for 3 h. Then cold air was aerated between the heat conductive layers on the furnace wall and inside the furnace wall to reduce the temperature to below 100° C. and the aeration of the helium gas was stopped. The resulting products were subjected to screening and demagnetization. The demagnetization was conducted for 5 times, the magnetic flux density was 10000 Gs, the treating temperature was 10° C., and the striking frequency by the electromagnetic hammer were 20 times/sec, thereby obtaining the lithium ion battery graphite negative electrode material with an average particle size of 19.8 μm.

Example 8

Epoxy resin doped with 10% $Ni_{0.5}Mg_{0.5}O$ was added to tetrahydrofuran to conduct liquid-phase mixing using a high speed stirrer with a stirring rotational speed of 10000 rpm and a stirring time of 20 min at a temperature of 92° C. To the mixture was added a microcrystalline graphite having a carbon content of more than 85% and a particle size of 3~40 μm, wherein the mass ratio of the epoxy resin to the microcrystalline graphite was 35:100, to conduct liquid mixing using high speed stirrer with a stirring rotational speed of 10000 rpm and stirring time of 240 min. The mass ratio of the used solvent, that is, tetrahydrofuran to the microcrystalline graphite was 40:10. A spray dryer was used for drying, with an inlet temperature of 400° C., an outlet temperature of 200° C., a pressure of 150 MPa and a feeding frequency of 200 Hz. The drying product was placed into a crucible equipped in a graphitization furnace. A mixed gas of nitrogen and argon was aerated in a flow rate of 10 L/min; the temperature was elevated up to 3200° C. in a heating rate of 1° C./min and high temperature graphitization was conducted for 0.5 h before temperature reduction. The high-temperature graphitized product was placed into a rotary furnace with a rotational speed of 100 rpm. The mixed gas of nitrogen and argon was aerated in a flow rate of 10 L/min; the temperature was elevated up to 1800° C. in a heating rate of 80° C./min and maintained for 6 h. Then the carbon source gas, that is, thiophene was aerated in a flow rate of 20 L/min to perform vapor deposition for 8 h. Then the aeration of the carbon source gas was stopped and the mixed gas of nitrogen and argon was aerated constantly in a flow rate of 10 L/min for 4 h. Then cold air was aerated between the heat conductive layers on the furnace wall and inside the furnace wall to reduce the temperature to below 100° C. and the mixed gas of nitrogen and argon was stopped. The resulting products were subjected to screening and demagnetization. The demagnetization was conducted for 5 times, the magnetic flux density was 10000 Gs, the treating temperature was 10° C., and the striking frequency by the electromagnetic hammer were 20 times/sec, thereby obtaining the lithium ion battery graphite negative electrode material with an average particle size of 18.2 μm.

Example 9

Artificial graphite having a carbon content of more than 85% and a particle size of 3~40 μm was placed in a VC-500 type mixer. Coal tar pitch, was introduced in the mass ratio of 5:100 to the natural spherical graphite, to conduct solid-phase mixing with a rotational speed of 3000 rpm and mixing time of 50 min, obtaining a mix. The mix was placed in a crucible equipped in a graphitization furnace. The volume of the mix was 70% of the capacity of the crucible. Nitrogen gas was aerated in a flow rate of 2 m³/h, the temperature was elevated up to 2800° C. in a heating rate of 1° C./min, high temperature graphitization was conducted for 10 h before temperature reduction. The high-temperature graphitized product was placed into a rotary furnace with a rotational speed of 15 rpm. Nitrogen gas was aerated in a flow rate of 0.5 L/min. The temperature was elevated up to 800° C. in a heating rate of 0.5° C./min and maintained for 3 h. Then the carbon source gas, that is, acetylene was aerated in a flow rate of 0.5 L/min to perform vapor deposition for 3 h. Then the aeration of the carbon source gas was stopped; nitrogen gas was aerated constantly in a flow rate of 0.5 L/min for 3 h. Then cold air was aerated between the heat conductive layers on the furnace wall and inside the furnace wall to reduce the temperature to below 100° C. and the aeration of the nitrogen gas was stopped. The resulting products were subjected to screening and demagnetization. The demagnetization was conducted for 3 times, the magnetic flux density was 10000 Gs, the treating temperature was 10° C., and the striking frequency by the electromagnetic hammer was 20 times/sec, thereby obtaining the lithium ion battery graphite negative electrode material with an average particle size of 49.6 μm.

Example 10

Acrylic resin doped with 15% $Fe(NO_3)_3$ was added to N-pyrrolidone (NMP) to conduct liquid-phase mixing using a high speed stirrer with a stirring rotational speed of 500 rpm and a stirring time of 180 min at a temperature of 50° C. To the mixture was added a natural graphite having a carbon content of more than 85% and a particle size of 1~40 μm, wherein the mass ratio of the acrylic resin to the natural graphite was 10:100 to conduct liquid mixing using high speed stirrer with a stirring rotational speed of 500 rpm and stirring time of 180 min. The mass ratio of the used solvent, that is, N-pyrrolidone (NMP) to the natural graphite was 2:1. A spray dryer was used for gas-phase drying, with an inlet temperature of 250° C., an outlet temperature of 110° C., a pressure of 10 MPa and a feeding frequency of 50 Hz. The product was placed in a crucible equipped in a graphitization furnace, wherein the volume of the product was 70% of the capacity of the crucible. Nitrogen gas was aerated in a flow rate of 1 m³/h; the temperature was elevated up to 3000° C. in a heating rate of 0.5° C./min and high temperature graphitization was conducted for 5 h before temperature reduction. The high-temperature graphitized product above was placed into a rotary furnace with a rotational speed of 0.5 rpm. Nitrogen gas was aerated in a flow rate of 15 L/min; the temperature was elevated up to 600° C. in a heating rate of 0.2° C./min and maintained for 1 h. Then the carbon source gas, that is, acetylene was aerated in a flow rate of 0.5 L/min to perform vapor deposition for 1 h. Then the aeration of the carbon source gas was stopped and nitrogen gas was aerated constantly in a flow rate of 0.5 L/min for 2 h. Then cold air was aerated between the heat conductive layers on the furnace wall and inside the furnace wall to reduce the temperature to below 100° C. and the aeration of the nitrogen gas was stopped. The resulting products were subjected to screening and demagnetization. The demagnetization was conducted by 5 times, the magnetic flux density was 10000 Gs, the treating temperature was 10° C., and the striking frequency by the electromagnetic hammer was 20 times/sec, thereby obtaining the lithium ion battery graphite negative electrode material with an average particle size of 1.2 μm.

Comparative Example 1

Natural flake graphite having a carbon content of more than 85% and a particle size of 3~40 μm was placed in a rotary furnace with a rotational speed of 10 rpm. Nitrogen gas was aerated in a flow rate of 5 L/min; the temperature was elevated up to 900° C. in a heating rate of 25° C./min and maintained for 3 h. Then the carbon source gas, that is, acetylene was aerated in a flow rate of 5 L/min to perform vapor deposition for 3 h. Then cold air was aerated between the heat conductive layers on the furnace wall and inside the furnace wall to reduce the temperature to below 100° C. and the aeration of the nitrogen gas was stopped. The resulting products were subjected to screening and demagnetization. The demagnetization was conducted for 3 times, the magnetic flux density was 10000 Gs, the treating temperature was 10° C., and the striking frequency by the electromagnetic hammer was 20 times/sec, thereby obtaining the lithium ion battery graphite negative electrode material with an average particle size of 12.9 μm.

Comparative Example 2

Natural spherical graphite having a carbon content of more than 85% and a particle size of 3~40 μm was placed in a rotary furnace with a rotational speed of 20 rpm. Nitrogen gas was aerated in a flow rate of 10 L/min; the temperature was elevated up to 600° C. in a heating rate of 5° C./min and maintained for 3 h. Then the carbon source gas acetylene was aerated in a flow rate of 10 L/min to perform vapor deposition for 3 h. Then cold air was aerated between the heat conductive layers on the furnace wall and inside the furnace wall to reduce the temperature to below 100° C. and the aeration of the nitrogen gas was stopped. The resulting products were subjected to screening and demagnetization. The demagnetization was conducted for 3 times, the magnetic flux density was 10000 Gs, the treating temperature was 10° C., and the striking frequency by the electromagnetic hammer was 20 times/sec, thereby obtaining the lithium ion battery graphite negative electrode material with an average particle size of 15.3 μm.

The lithium ion battery graphite negative electrode materials prepared in examples 1~10 and comparative examples 1 and 2 were measured by the following methods:

The morphology of the lithium ion battery graphite negative electrode materials prepared in the present invention was observed by using S4800-I scanning electron microscope from Hitachi Limited, and the length and diameter of the carbon nanotubes and/or carbon nanofibers were measured.

The interlayer spacing $D_{002}$ of the crystals were measured by PW3040/60 X' Pert X-ray diffractometer from PANalytical B.V., Nederland. The interlayer spacing D002 of the crystals of examples 1~10 all fell into the scope of 0.3356~0.347 nm.

The specific surface areas were measured by nitrogen gas replacement BET method.

The mass ratio of the surface-coating layers to the graphite substrates was calculated by the following method:

The mass ratio of the surface-coating layers to the
graphite substrates=the mass of the carbon material precursor×carbon yield ratio of the carbon material precursor at the sintering temperature thereof/the mass of the graphite substrates.

The mass ratio of the carbon nanotubes and/or carbon nanofibers to the graphite substrates was calculated by the following formula:

a. on the condition of excluding the step of low-temperature carbonization or high-temperature graphitization:

> The mass ratio of the carbon nanotubes and/or carbon nanofibers to the graphite substrates=(the mass of the composite material−the mass of the product after heat treatment of the mixed material)/the mass of the graphite substrates;

b. on the condition of including the step of low-temperature carbonization:

> The mass ratio of the carbon nanotubes and/or carbon nanofibers to the graphite substrates=(the mass of the composite material−the mass of the product after low-temperature carbonization of the mixed material)/the mass of the graphite substrates;

c. on the condition of including the step of high temperature graphitization:

> The mass ratio of the carbon nanotubes and/or carbon nanofibers to the graphite substrates=(the mass of the composite material−the mass of the product after high temperature graphitization of the mixed material)/the mass of the graphite substrates.

It should be illustrated that the products having different nanometer forms (carbon nanotube, carbon nanofiber) may be generated in different conditions, thus "carbon nanotubes and/or carbon nanofibers" is used herein and other places in the content to denote all the products of different nanometer forms in the obtained composite material. It should be understood by the readers that the meaning thereof is clear.

The particle size range of materials and the average particle size of the raw material particles were measured by Malvern laser particle size analyzer MS2000.

The results above are shown in table 1.

TABLE 1

| Examples | Specific surface area ($m^2/g$) | The mass ratio of the surface-coating layers to the graphite substrates (%) | Carbon nanotubes and/or carbon nanofibers Average diameter (nm) | Average length (μm) | The mass ratio to the graphite substrates (%) |
|---|---|---|---|---|---|
| Example 1 | 8 | 0.45 | 30~500 | 1~100 | 5.3 |
| Example 2 | 2.5 | 14.8 | 30~500 | 1~100 | 12.8 |
| Example 3 | 6.5 | 7.2 | 30~500 | 1~100 | 10.2 |
| Example 4 | 3.1 | 0.01 | 30~500 | 1~100 | 12.9 |
| Example 5 | 3.8 | 0.1 | 30~500 | 1~100 | 9.9 |
| Example 6 | 15 | 5.5 | 30~500 | 1~100 | 11.2 |
| Example 7 | 1.1 | 4.2 | 10~500 | 0.5~100 | 0.02 |
| Example 8 | 19.9 | 5.3 | 10~500 | 0.5~100 | 14.8 |
| Example 9 | 2.4 | 4.1 | 30~500 | 1~100 | 1.2 |
| Example 10 | 20 | 1.0 | 30~500 | 1~100 | 15 |

The electrochemical properties were measured by the following methods: the lithium ion battery graphite negative electrode materials prepared in examples 1~10 and comparative example 1 and 2 were used as a negative electrode material, and respectively mixed with adhesion agents styrene-butadiene rubber (SBR) and sodium carboxyl methyl cellulose (CMC) in the ratio of 96.5:1.5:2.0. A slurry having a solid content of 40% was obtained, coated on a copper foil current collector having a thickness of 10 μm, and prepared into a negative electrode piece by vacuum drying and roller pressing. $LiCoO_2$, $LiNiO_2$, $LiMnO_4$ or $LiFePO_4$ were used as a positive electrode material. By using the electrolyte of 1 mol/L $LiPF_6$ in three-component-mixed solvent according to EC:DMC:EMC=1:1:1 (v/v) and using a PE/PP/PE composite membrane as a diaphragm, 18650 type battery monomer is assembled through the conventional manufacturing process. The system is tested for the first discharge capacity and the first efficiency of the lithium ion battery graphite negative electrode material by using CT2001C battery of LAND battery test system from Jinnuo, Wuhan. The rapid charge-discharge property was assessed for the variety of discharge capacity by using 1 C charge and then 1 C, 5 C, 10 C, 20 C and 30 C discharge respectively.

The electrochemical test results of the lithium ion battery graphite negative electrode material prepared in examples 1~10 and comparative examples 1 and 2 are shown in table 2 and table 3.

TABLE 2

| | Parameters First cycle | | | |
|---|---|---|---|---|
| Examples | Charge capacity (mAh/g) | Discharge capacity (mAh/g) | Irreversible capacity (mAh/g) | Coulombic efficiency (%) |
| Example 1 | 400 | 369 | 31 | 92.25 |
| Example 2 | 394 | 368 | 26 | 93.4 |
| Example 3 | 387 | 359 | 28 | 92.76 |
| Example 4 | 365 | 349 | 16 | 95.62 |
| Example 5 | 390 | 367 | 23 | 94.1 |
| Example 6 | 399 | 367 | 32 | 91.98 |
| Example 7 | 390 | 365 | 25 | 93.59 |
| Example 8 | 388 | 357 | 31 | 92.01 |
| Example 9 | 357 | 335 | 22 | 93.9 |
| Example 10 | 389 | 349 | 40 | 89.7 |
| Comparative Example 1 | 402 | 360 | 42 | 89.55 |
| Comparative Example 2 | 390 | 349 | 41 | 89.49 |

TABLE 3

| | Parameters | | | |
|---|---|---|---|---|
| | Discharge | Rate discharge | | |
| Example | capacity at the $10^{th}$ cycle (mAh/g) | 1C discharge capacity (mAh/g) | 5C discharge capacity (mAh/g) | 10C discharge capacity (mAh/g) |
| Example 1 | 369 | 359 | 345 | 338 |
| Example 2 | 369 | 355 | 348 | 340 |
| Example 3 | 359 | 353 | 349 | 345 |
| Example 4 | 350 | 340 | 338 | 337 |
| Example 5 | 366 | 355 | 348 | 330 |
| Example 6 | 359 | 350 | 345 | 331 |
| Example 7 | 365 | 348 | 325 | 320 |
| Example 8 | 348 | 349 | 340 | 330 |
| Example 9 | 335 | 328 | 326 | 315 |
| Example 10 | 343 | 340 | 338 | 335 |
| Comparative Example 1 | 355 | 348 | 331 | 320 |
| Comparative Example 2 | 347 | 345 | 329 | 310 |

Figure 1:
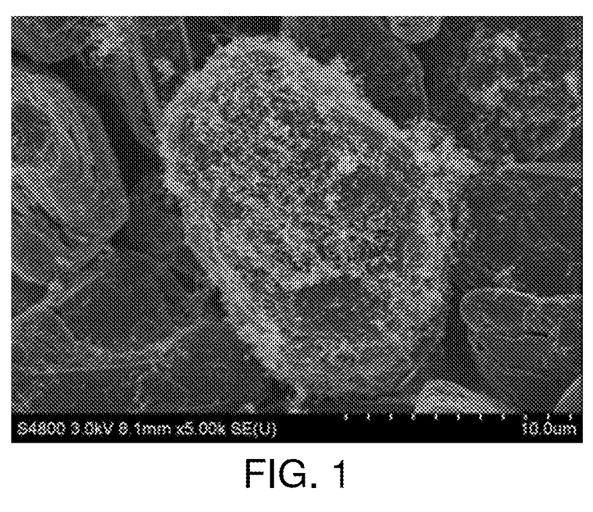
FIG. 1 is an exterior SEM view of the lithium ion battery graphite negative electrode material obtained in example 1 of the present invention.

As shown in FIG. 1, the exterior SEM view of the lithium ion battery graphite negative electrode material obtained in Example 1 shows that the network carbon nanotubes and/or carbon nanofibers are distributed on the surface.

Figure 2:
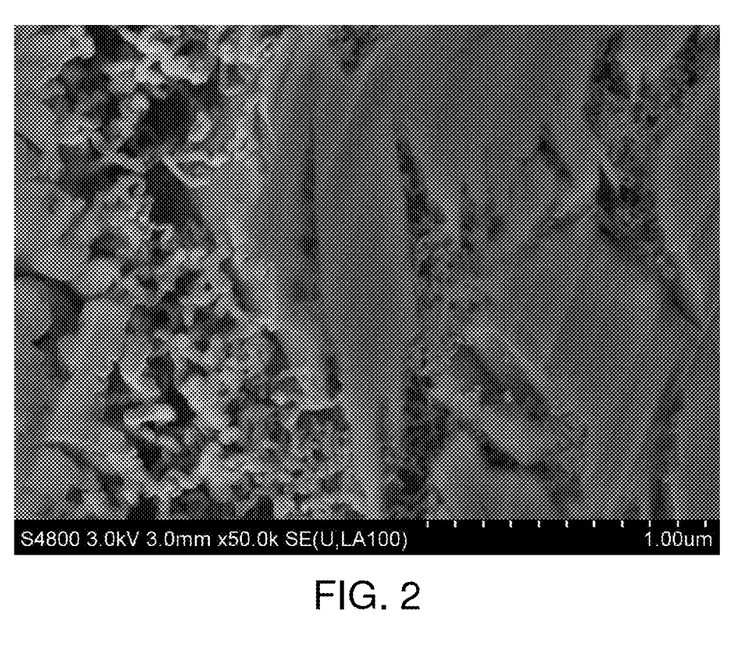
FIG. 2 is a section SEM view of the lithium ion battery graphite negative electrode material obtained in example 1 of the present invention.

As shown is FIG. 2, the section SEM view of the lithium ion battery graphite negative electrode material obtained in Example 1 shows that the network carbon nanotubes and/or carbon nanofibers are distributed in the interlayers of the graphite substrates.

Figure 3:
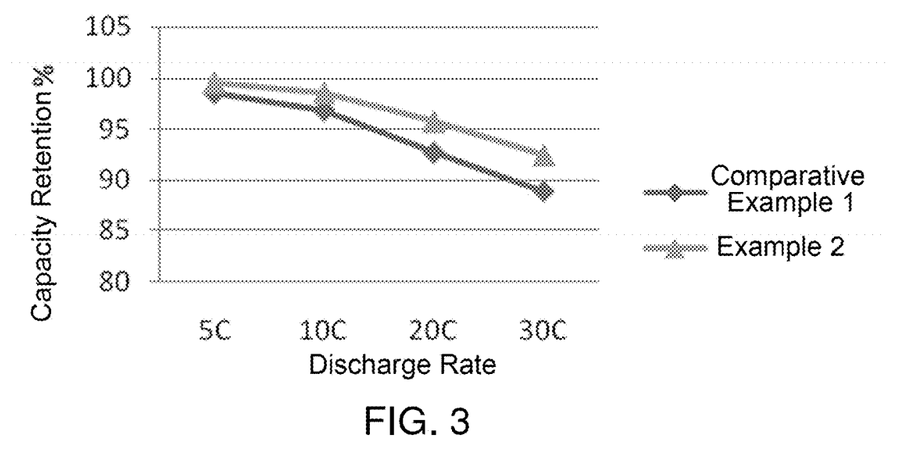
FIG. 3 is a contrast diagram of between the rate performance of the lithium ion battery graphite negative electrode material obtained in example 2 and that of comparative example 1.

As shown in FIG. 3, capacity retention of the lithium ion battery graphite negative electrode materials obtained in Example 2 under a discharge rate of 5 C, 10 C, 20 C and 30 C have obvious advantage compared to Comparative Example 1.

Figure 4:
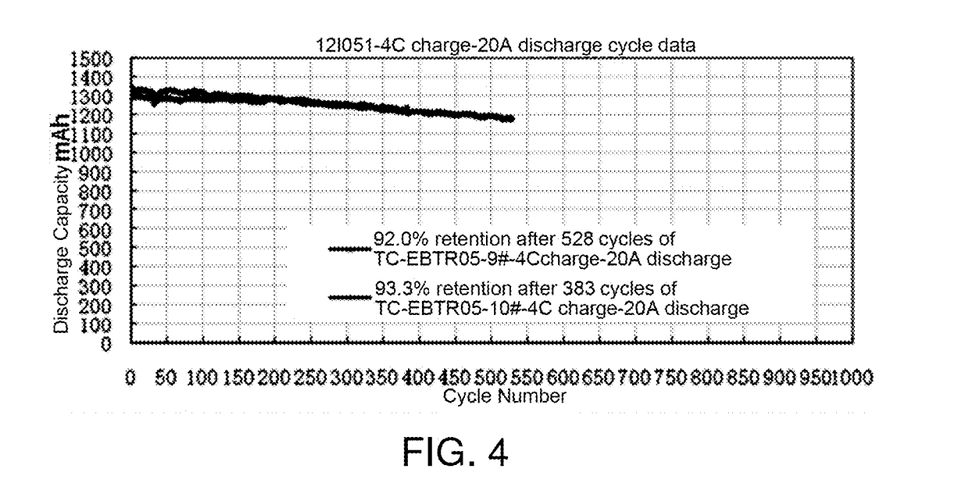
FIG. 4 is a diagram of the rate cycle performance of the lithium ion battery graphite negative electrode material obtained in example 2 of the present invention.

As shown in FIG. 4, the rate cycle performance diagram of the lithium ion battery graphite negative electrode material obtained in Example 2 shows that the capacity retention after 528 charge-discharge cycles reaches 92%, which means the cycle stability is excellent.

Figure 5:
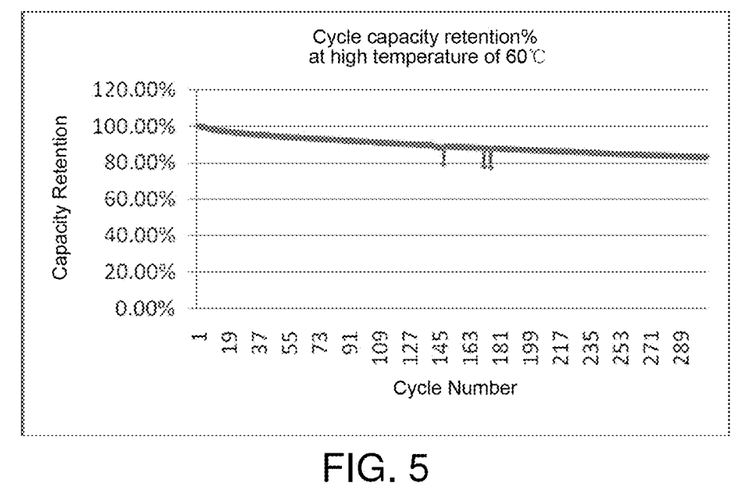
FIG. 5 is a diagram of 0.6 C charge-discharge cycle performance at high temperature of the lithium ion battery graphite negative electrode material obtained in example 2 of the present invention.

As shown in FIG. 5, for the lithium ion battery graphite negative electrode material obtained in Example 2, the cycle capacity retention after 300 cycles at high temperature 60° C. is 82%, which means the obtained lithium ion battery graphite negative electrode material has excellent cycle performance at high temperature and has good compatibility with electrolytes.

Figure 6:
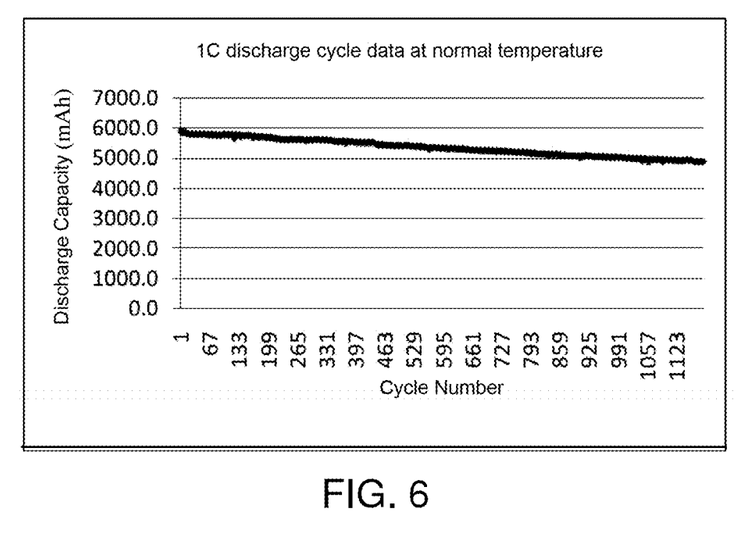
FIG. 6 is a diagram of 1 C charge-discharge cycle performance at normal temperature of the lithium ion battery graphite negative electrode material obtained in example 2 of the present invention.

As shown in FIG. 6, 1 C cycle data at normal temperature of the lithium ion battery graphite negative electrode material obtained in Example 2 shows that the capacity is 82.5% after 1185 cycles, which means that the obtained lithium ion battery graphite negative electrode material has excellent cycle performance.

As can be known by the experimental results above, the lithium ion battery graphite negative electrode material prepared by the method of the present invention has excellent electrochemical properties, high first charge-discharge efficiency, stable cycle at high and low temperature. The reason thereof is analyzed in that: on the basis of electrochemical properties improved by carbon nanotubes and/or carbon nanofibers, the dense and uniform amorphous carbon surface-coating layers outside the graphite substrates further improve the electrochemical properties.

The applicants declare that, the present invention explains the detailed process equipment and procedure by the examples above, the present invention, however, is not limited to the detailed process equipment and procedure above, that is to say, it does not mean that the present invention must be carried out depending on the detailed process equipment and procedure above. It should be understood by those skilled in the art, any improvement to the present invention, equivalent replacement to the raw materials of the products of the present invention, additions of adjuvant components, alternations of the embodiments, etc. all fall in to the scope of protection and disclosure of the present invention.

The invention claimed is:

1. A lithium ion battery graphite negative electrode material, wherein the lithium ion battery graphite negative electrode material is a composite material comprising:
   graphite substrate,
   a surface coating layer coated on the graphite substrate, and
   carbon nanotubes and/or carbon nanofibers grown in situ on the surface of the surface coating layer,
   wherein the surface coating layer is amorphous carbon formed by carbonization of a carbon material precursor; wherein the carbon material precursor is comprised of an acrylic resin doped with 1-5% $Fe(NO_3)_3$,
   wherein the mass ratio of the carbon nanotubes and/or carbon nanofibers to the graphite substrate is 5.3:100~15:100.

2. The lithium ion battery graphite negative electrode material according to claim 1, wherein the interlayer spacing $D_{002}$ of the composite material is 0.3356~0.347 nm, the specific surface area is 1~20 $m^2/g$, and the mass ratio of the surface coating layer to the graphite substrate is 0.01:100~15:100; the carbon nanotubes and/or carbon nanofibers are of networked structure with an average length of 0.5~100 μm and an average diameter of 10~500 nm.

3. A preparation method of the lithium ion battery graphite negative electrode material according to claim 1, including the following steps:
   (1) mixing the graphite substrate with a carbon material precursor comprised of an acrylic resin doped with 1-5% $Fe(NO_3)_3$ to obtain a mixture; and
   (2) forming a surface coating layer of amorphous carbon by carbonization of the carbon material precursor and growing carbon nanotubes and/or carbon nanofibers in situ on the surface of the surface coating layer by: performing a chemical vapor deposition under a protective atmosphere at an elevated temperature of 200~1800° C., and subsequently carrying out heat insulation and temperature reduction, to obtain the lithium ion battery graphite negative electrode material.

4. The method according to claim 3, wherein the interlayer spacing $D_{002}$ of the composite material is 0.3356~0.347 nm, the specific surface area is 1~20 $m^2/g$, the surface coating layer is amorphous carbon formed by carbonization of the carbon material precursor and the mass ratio of the surface coating layer to the graphite substrate is 0.01:100~15:100; the carbon nanotubes and/or carbon nanofibers are of networked structure with an average length of 0.5~100 μm and an average diameter of 10~500 nm.

5. The method according to claim 3, further including the following step after step (2):
   (3) screening and demagnetizing to obtain the lithium ion battery graphite negative electrode material with a particle size of 1~50 μm.

6. The method according to claim 3, wherein the mixing in step (1) is solid-phase mixing or liquid-phase mixing, and wherein the method optionally comprises one or more of:
   the solid-phase mixing is conducted by any one selected from the group consisting of high speed modified VC mixer, cone mixer, ball mill, kneading machine and fusion machine;
   the rotational speed of the high speed modified VC mixer is 100~8000 rpm;
   the mixing time of the high speed modified VC mixer is 1~300 min;
   the liquid-phase mixing is conducted by a high speed stirrer or through sol-gel method;
   the stirring speed of the high speed stirrer is 100~12000 rpm;
   the stirring time of the high speed stirrer is 1~300 min;
   the mixing temperature of the liquid-phase mixing is 5~95° C.;
   the solvent of the liquid-phase mixing is water and/or organic solvents,
   the organic solvent of the liquid-phase mixing is one selected from the group consisting of tetrahydrofuran, amides, alcohols and ketones, or combination of at least two;
   the mass ratio of the solvent to the graphite substrate used in the liquid-phase mixing is 0.5:10~50:10;

the drying is conducted by a spray dryer, a suction filtration machine or a freeze dryer; or the inlet temperature of the spray dryer is 110~500° C.; the pressure of the spray dryer is 5~150 MPa; the feeding frequency of the spray dryer is 2~200 Hz.

7. The method according to claim 3, wherein the graphite substrate in step (1) is one selected from the group consisting of natural flake graphite, microcrystalline graphite, crystalline vein graphite, artificial graphite, natural spherical graphite, mesocarbonmicrobead and conductive graphite, or combinations of at least two.

8. The method according to claim 3, wherein
in step (1) the mass ratio of the carbon material precursor to the graphite substrate material is 0.01:100~40:100.

9. The method according to claim 3, further including the following step between the steps (1) and (2):

(2a) the mixture obtained in step (1) is subjected to, under a protective atmosphere, low temperature carbonization or high temperature graphitization to obtain low temperature carbonized material or a high temperature graphitized material respectively, and wherein the method optionally comprises one or more of:

the process of the low temperature carbonization described in step (2a) is as follows: the mixture obtained in step (1) is placed into a crucible equipped in takasago kiln, tunnel kiln, roller kiln or baking furnace, heated to 200~2000° C. with a heating rate of less than 20° C./min under a protective atmosphere, subjected to low temperature carbonization for less than 60 h, and then subjected to temperature reduction;

the heating rate during the low temperature carbonization in step (2a) is less than 20° C./min;

the temperature during the low temperature carbonization in step (2a) is 200~2000° C.;

the protective atmosphere in step (2) is an inert gas;

the flow rate of the protective atmosphere in step (2a) is less than 20 m³/h;

the period for low temperature carbonization in step (2a) is less than 60 h;

step (2a) includes: the mixed material obtained in step (1) is placed into the crucible equipped in a graphitization furnace, heated to 2500~3500° C. with a heating rate less than 20° C./min under a protective atmosphere, subjected to high temperature graphitization for less than 60 h, and then subjected to temperature reduction;

the heating rate during the high temperature graphitization in step (2a) is less than 20° C./min;

the temperature during the high temperature graphitization in step (2a) is 2500~3500° C.;

the period for the high temperature graphitization in step (2a) is less than 80 h.

10. The method according to claim 3, wherein the process in step (2) is as follows: the temperature is elevated to 200~1800° C. under a protective atmosphere in a furnace chamber of a rotary furnace, tube furnace, or carbon tube furnace, and remained for less than 6 h; then a carbon source gas is constantly aerated and the temperature is maintained for less than 12 h; then the carbon source gas is stopped and the protective gas is aerated again; and lithium ion battery negative electrode material is obtained after temperature reduction, and wherein the method optionally comprises one or more of:

in the process of step (2), the protective atmosphere is inert gas;

in the process of step (2), the flow rate of the protective atmosphere is less than 20 L/min;

in the process of step (2), the rotational speed of the furnace chamber is less than 100 rpm;

in the process of step (2), the heating rate is less than 80° C./min;

in the specific process of the step (2), the temperature is elevated up to 200~1800° C.;

in the specific process of the step (2), the temperature is maintained for less than 6 h;

in the specific process of the step (2), the aerated carbon source gas is one selected from the group consisting of methane, acetylene, ethylene, natural gas, liquefied petroleum gas, benzene, thiophene, or combination of at least two;

in the specific process of the step (2), the flow rate of the aerated carbon source gas is less than 20 L/min;

in the specific process of the step (2), the carbon source gas is constantly aerated and the temperature is maintained for less than 12 h;

in the specific process of the step (2), the mode for temperature reduction is conducted in a mode of aerating compressed air between the heat conductive layers on the furnace wall and inside the furnace wall or naturally;

in the specific process of the step (2), the temperature reduction is conducted to below 100° C.;

the particle size of the lithium ion battery graphite negative electrode material obtained in the step (3) is 3~50 μm.

11. A preparation method of the lithium ion battery graphite negative electrode material of claim 1, comprising the following steps:

(1) mixing the carbon material precursor comprised of an acrylic resin doped with 1-5% Fe(NO₃)₃ with the graphite substrate in solid phase or liquid phase following a mass ratio of 0.5:100~30:100, to obtain a mixture;

(2) the mixture obtained in step (1) is subjected to low temperature carbonization or high temperature graphitization under a protective atmosphere to obtain low temperature-carbonized material or high temperature-graphitized material respectively;

(3) forming a surface coating layer of amorphous carbon by carbonization of the carbon material precursor and growing carbon nanotubes and/or carbon nanofibers in situ on the surface of the surface coating layer by: under the protective atmosphere, the low temperature-carbonized material or the high temperature-graphitized material obtained in the step (2) is heated to 300~1300° C. and thermo-insulated for less than 6 h; then the carbon source gas is aerated at 300~1300° C., thermo insulation is conducted for less than 12 h and the protective gas is aerated again; the mass ratio of the resultant carbon nanotubes and/or carbon nanofibers to the graphite substrate is 5.3:100~15:100; the lithium ion battery negative electrode material is obtained after temperature reduction;

(4) the lithium ion battery graphite negative electrode material with a particle size of 1~50 μm is obtained through screening and demagnetization.

12. The method according to claim 11, wherein the interlayer spacing $D_{002}$ of the composite material is 0.3356~0.347 nm, the mass ratio of the surface coating layer to the graphite substrate is 0.01:100~15:100; the carbon nanotubes and/or carbon nanofibers are of networked structure with an average length of 0.5~100 μm and an average diameter of 10~500 nm.

13. The method according to claim 9, wherein the inert gas is selected from the group consisting of nitrogen gas, argon gas, helium gas, and neon gas.

14. The method according to claim 10, wherein the inert gas is selected from the group consisting of nitrogen gas, argon gas, helium gas, and neon gas.

15. The method according to claim 7, wherein the carbon content of the graphite substrate material is more than 85%, the major-minor axis ratio is 1.0~4.5 and the average particle size is 3~40 μm.

16. A lithium ion battery graphite negative electrode material, wherein the lithium ion battery graphite negative electrode material is a composite material comprising:
   graphite substrate;
   a surface coating layer coated on the graphite substrate; and
   carbon nanotubes and/or carbon nanofibers grown in situ on an upper surface of the surface coating layer,
   wherein the lithium ion battery graphite negative electrode material provides a 10 C discharge capacity within a range of about 330 mAh/g to as high as about 345 mAh/g,
   wherein the surface coating layer is amorphous carbon formed by carbonization of a carbon material precursor; wherein the carbon material precursor is comprised of an acrylic resin doped with 1-15% $Fe(NO_3)_3$,
   wherein the mass ratio of the carbon nanotubes and/or carbon nanofibers to the graphite substrate is 5.3:100~15:100.

17. The lithium ion battery graphite negative electrode material of claim 16, wherein the lithium ion battery graphite negative electrode material provides a 10 C discharge capacity within a range of about 340 mAh/g to as high as about 345 mAh/g.

18. A preparation method of the lithium ion battery graphite negative electrode material according to claim 16, including the following steps:
   (1) mixing the graphite substrate with the carbon material precursor; and
   (2) forming a surface coating layer of amorphous carbon by carbonization of the carbon material precursor and growing carbon nanotubes and/or carbon nanofibers in situ on the surface of the coating layer by: performing a chemical vapor deposition under a protective atmosphere at an elevated temperature of 200~1800° C., and subsequently carrying out heat insulation and temperature reduction, to obtain the lithium ion battery graphite negative electrode material.

19. The method according to claim 18, further including the following step after step (2):
   (3) screening and demagnetizing to obtain the lithium ion battery graphite negative electrode material with a particle size of 1~50 μm.

* * * * *